350-383 SR
XR 3,725,574

United States Patent [19]

Gast

[11] 3,725,574

[45] Apr. 3, 1973

[54] METHOD AND APPARATUS FOR RECORDING RASTERED CONTINUOUS-TONE PICTURES IN PRINTED GRAPHICS

[75] Inventor: Uwe Gast, Rammsee, Germany

[73] Assignee: Dr.-Ing. Rudolf Hell GmbH, Kiel, Germany

[22] Filed: Feb. 14, 1972

[21] Appl. No.: 225,835

[30] Foreign Application Priority Data

Feb. 18, 1971 Germany....................P 21 07 738.3

[52] U.S. Cl..................178/6.7 R, 346/108, 350/150
[51] Int. Cl................................................H04n 5/84
[58] Field of Search.178/6.7 R, 6.6 B, 5.2 R, 5.4 CR; 346/108; 350/150, 157

[56] References Cited

UNITED STATES PATENTS

| | | | |
|---|---|---|---|
| 3,482,899 | 12/1969 | Schmidt | 350/157 |
| 3,657,472 | 4/1972 | Taudt et al. | 178/6.6 B |
| 3,407,405 | 10/1968 | Hoadley | 346/108 |
| 3,408,656 | 10/1968 | Lamberts | 346/108 |
| 2,801,279 | 7/1957 | Yule | 178/6.7 R |

*Primary Examiner*—James W. Moffiti
*Attorney*—Carlton Hill et al.

[57] ABSTRACT

A method of recording half-tone pictures i.e. rastered continuous-tone pictures in printed graphics in which respective covering dots create the recorded picture, with the size of the dots corresponding to the tone value to be depicted thereby in which recordation is effected on a light-sensitive medium by directing thereon polarized light with each covering dot being formed in a respective individual raster field, the area of which field represents approximately the maximum size of a dot, with the path of such light between the source thereof and the recording medium having variable polarization characteristics whereby the amount of light striking the medium may be varied over the raster field and thereby determine the size of the covering dot formed in such raster field with the polarization characteristics of such light path being varied in accordance with the characteristics of the picture to be produced whereby the intensity of the light directed on the medium at the different portions of the raster field it is controlled in dependence upon the size of the dot to be produced for creating the desired tone effect thereat. Apparatus is also provided for practicing the invention utilizing electrically-controllable rotary crystals in combination with polarization filters disposed between such crystals and the recording medium.

20 Claims, 10 Drawing Figures

3725574
OR IN 358/298

METHOD AND APPARATUS FOR RECORDING RASTERED CONTINUOUS-TONE PICTURES IN PRINTED GRAPHICS

BACKGROUND OF THE INVENTION

The invention is directed to a method and apparatus for the recordation of half-tone pictures i.e., rastered continuous-toned pictures composed of a plurality of "raster dots" which are recorded in respective individual raster fields and which correspond to size to the tone values to be depicted, using one or more light beams to produce the desired raster dots.

In actual practice, however, such raster dots are black spots within raster which are produced by means of a theoretical network of orthoginal lines covering the field of vision with the spots thus varying in size to more or less fill a raster field. Spots representing white or light parts of a picture are relatively very small and when darker or black parts of a picture are to be depicted cover the raster field almost completely. Such spots, may be for example, be produced by means of very closely bundled light beams which produce respective light dots on the recordation film and are suitably simultaneously moved and scanned for respective dark or bright areas. The light dots are smaller in size than the "raster dots" by almost two orders and to avoid misunderstandings in the following disclosure, the word "raster dots" has been avoided and the term "covering spot" has been employed.

Devices for the reproduction of rastered continuous-tone pictures, as disclosed in the prior art generally utilize a suitable contact raster foil, which is applied over a light sensitive recordation film, and a light beam, which carries only the picture information passes through the foil and exposes the film therebehind. This type of production is awkward and in addition to considerably increasing the time involved, requires careful consideration in its practice. In addition to this, such type of operation is subject to many disadvantages as an individual contact raster foil is required for each individual raster-rotation angle employed in multi-color printing and such foils are very sensitive to handling and usage resulting relatively rapid wear.

As a result, it is particularly desirable and advantageous to avoid the use of a raster foil and to superimpose the raster information on the exposing light beam along with the light intensity (bright-dark) information. Reference is made to British Pat. No. 1,097,735 and French Pat. No. 1,585,163 in both of which patents black spots of different sizes are recorded within respective raster boundaries, which sizes correspond to the density values of the various portions of the picture which is to be recorded. Such spots are produced by a single light beam which moves over the raster field in adjacent lines one after the other whereby it is scanned for desired bright and dark values, respectively according to a desired pattern or program. Cathode ray tubes usually are utilized as the means for producing the desired light beams. However, such tubes are not capable of producing sufficient brightness to fulfill the requirements at high recordation speeds associated with modern devices. Furthermore, in such type of apparatus unevenness of the light-screen crystals and the presence of after glow on the picture screen becomes undesirably noticeable in an interfering manner. An improvement is illustrated in DOS (Deutsche Offenlegungsschrift) No. 1,901,101, wherein there is illustrated the recordation of raster dots by means of several individually controlled light beams which project adjacent light dots on the recordation medium. The light dots are in a fixed position and only the brightness of the individual dots is controlled, no deflection being employed. As a result, other types of relatively strong, controllable light sources can be substituted for the cathode ray tube, for example, hollow-cathode glow lamps and the like. However, these likewise do not adequately meet current requirements as they do not have sufficient light intensity and cannot be scanned sufficiently rapid.

BRIEF SUMMARY OF THE INVENTION

The invention is directed to the problem of improving the brightness and scanning speeds employed and therewith an increase in the recordation speed. This is achieved in accordance with the invention by utilizing one or several polarized laser beams as the light source, with the intensity of light reaching the recording medium being controlled by effecting suitable variations in the polarization characteristics of the light path over which the polarized laser beam or beams travels to the recording medium. In the examples hereinafter described, electrically controllable rotary crystals are employed to effect the desired variation in polarization characteristics of such light path or paths.

In one preferred embodiment of apparatus for carrying out the method of invention, several recording laser beams are derived from a main beam by a utilization of suitable separating means with the individual beams so derived being respectively guided to the recordation location with the utilization of light-fiber conductors.

In another preferred embodiment of the invention, the covering spots are produced by a single laser beam which is deflected over a raster field successively and repeatedly, for example utilizing suitable deflection means, employing saw-tooth shaped voltages for example, effecting deflection by means of a crystal whose light-refraction index is controlled by means of an electric field. In accordance with a further feature of the invention, the modulation of the recording beam of beams is effected by means of a polarization filter and a rotary crystal disposed between the filter and the light source, and rotary crystal being so arranged that the light beam may be polarized with the direction of polarization so varying with respect to the direction of polarization effected by the polarization filter that such directions are transverse for a "dark" condition or position and by effecting suitable rotation of the polarization plane of the laser beam out of such dark position in the direction of coincidence with the polarization plane of the filter, a bright condition or position may be achieved.

As rotary crystals of the type presently available are temperature sensitive, in accordance with the invention suitable control means is provided for maintaining the operational temperature of the crystals constant. In the embodiment illustrated, there is employed a liquid supply container adapted to maintain a constant liquid temperature, a circulating pump and container system through which the cooling liquid is conducted to control crystals and the laser beam generator in succession.

BRIEF DESCRIPTION OF THE DRAWINGS

In the drawings wherein like reference numerals indicate like or corresponding parts:

FIG. 2 illustrates an individual raster field such as employed with the device of FIG. 1, illustrating the relationship of the respective light beams to the size of the covering spot produced, while FIGS. 2*a*, 2*b*, 2*c*, and 3*d* illustrate examples of covering spots of varying areas which may be recorded with a device such as illustrated in FIG. 1;

FIG. 4 illustrates a single raster field such as may be recorded with a device such as illustrated in FIG. 3.

DETAILED DESCRIPTION OF THE INVENTION

Figure 1:
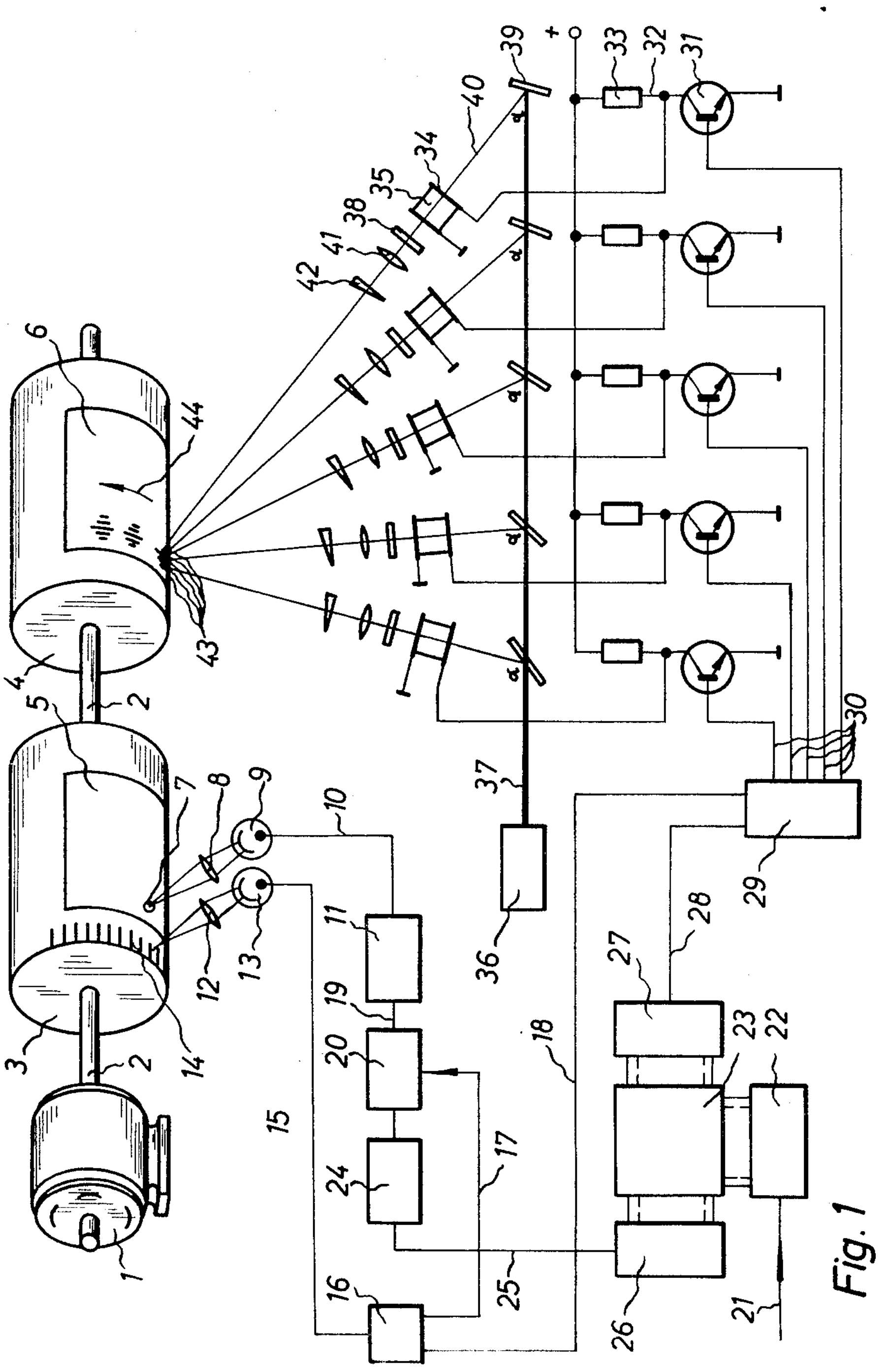
FIG. 1 is a semi-diagrammatic figure schematically illustrating a structure and circuitry for practicing the present invention with the utilization of a plurality of laser beams.

FIG. 1 illustrates apparatus for practicing the invention in which a plurality of cooperable light beams are employed to effect the desired recordation. A suitable motor 1 is operative to drive suitable drums 3 and 4 on a common axis 2 with the drums having a direction of rotation as indicated by the arrow 44. An original or pattern 5, from which a raster recordation is to be made is mounted on the drum 3 with the recordation to be produced on a recording medium such as a film sheet 6 which is suitably carried by the drum 4. While transmission in the illustrated construction to be effected at a 1:1 ratio may be accordingly altered as desired.

At some instance during the transmission operation, a location or area 7 of the original 5 is scanned by a suitable optical system 8, with the brightness or light intensity values being derived by means of a photo-cell 9, conducted as electrical signals over the line 10 to a computer device 11, for example, a color calculator and/or a graduation converter. A second scanning optical system 12 and photo-cell 13 simultaneously scans impulses from a line scale 14 adjacent the edge of the roller 3 which are conducted over a conductor 15 to a timing - pulse generator 16. The generator 16 thus supplies timing pulses to the timing lines or conductors 17 and 18, the frequencies of which are synchroniously coupled with the recordation frequency of the raster spots.

The values derived in the computer means 11 thus correspond to the density appearing at each scanned area 7 of the original 5. Where color reproduction is involved, such density would relate to the color of a color separation obtained, for example, by the use of suitable color filters.

The density values appearing at the output conductor 19 of the computer 11 are analog values and are compared in a comparing device 20 with a gray scale in the time or rhythm of the impulses supplied by the conductor 17, and segregated into a sequence of numbers.

The entire density range between white and black is subdivided into a finite number of gray states or values which increase at uniform density values and each of such gray states is associated with the production of a covering spot whose size corresponds to the particular density state involved. The electronic data for recording the spots and the assigned storage addresses are derived by the use of a special method and apparatus which is not the subject matter of the present invention, and prior to the start of the recording operation are read into a memory 23 over a conductor 21 and an input register 22, where they are available for the particular operation involved as well as for subsequent operations, if desired.

The coding device 24 is operable to supply a binary number for the corresponding density state or value derived in the comparing device 20 and represents the address of which the recordation data of the associated register spot in the memory 23 can be obtained. This number of conducted over the conductor path 25 to an address register 26 as a combination of binary voltage values with the conductor path 25, comprising, for example, six individual conductors when the number of distinct covering spots is 64. Thus, the addresses at which the recordation data pertaining to the covering spots are thereby stored. Controlled by suitable memory-associated automatic electronic means, the read-out of the data into a read register 27 will begin immediately and conducted over conductor path 28 to a raster computer 29 which is also controlled by timing pulses conducted over the timing pulse conductor 18, which pulses have the same frequency as pulses at the line 17 but are delayed for a brief period of time with respect thereto, whereby the operational time of the coding device 24 and cyclic time of the memory 23 are compensated.

The raster computer 29 has as many outputs 30 as the number of adjacently arranged light dots employed for the recordation. In the illustrated example only 5 are depicted, but in actual practice up to 10 may be employed. The outputs 30 are connected with suitable amplifiers 31, which for example, may be transistors whose emitters are disposed at zero potential and the collectors connected with the positive pole of a voltage source, over resistors 33. The collectors 32, forming the output of the amplifiers, are connected with the control electrodes 34 of respective so-called rotary crystals 35. Such crystals possess the property that the polarization planes of polarized light passing therethrough are rotated under the effect of an electric field.

The reference numeral 36 generally designates a laser beam generator producing a constant polarized light beam 37 which passes through five partially reflective partially light-permeable mirrors 39 whereby respective secondary beams 40 are reflected out of the main laser beam 37 and directed onto the recordation area 43 of the film 6 by suitable adjustment of the respective mirrors 39. The individual secondary beams must be very carefully and exactly directed so that they project a group of closely adjacent light dots which are equal in width to the raster field. The reflective surfaces, for example, evaporated on, are so constructed that the individual beams 40 have approximately equal light intensity irrespective to the different reflection angles $\alpha$. Exact equalization between the respective beams may be achieved by the adjustment of suitable gray wedges 42, operative to vary the light intensity in dependence upon the length of light travel therethrough.

Disposed in the path of each light beam 40 between the recordation area 43 and the respective mirrors 39 are respective corresponding rotary crystals 35, polarization filters 38 and lenses 41. Thus, each light beam reflected from an associated mirror 39 will initially pass through the cooperable rotary crystal 35, polarization filter 38, lens 41 and gray wedge 42. The polarization planes of the filters 38 are rotated exactly 90° with respect to the polarization planes of the respective beams whereby no light will pass to the recording medium 6 as long as the crystals 35 are not excited. However, if voltage is applied to the control electrode 34 of a rotary crystal 35 over associated conductor 30 and amplifier 31, an electric field will be produced in the crystal, since the opposing electrode has zero potential, resulting in a rotation of the polarization plane of the associated laser beam 40. As the polarized light now will not strike the filter at the blocking angle at least a part of the light will pass therethrough, such light portion corresponding to a non-linear function depending on the angle of rotation between the two polarization planes. In this instance, scanning is intended to be effected only between "-dark" or "closed" and "light" or "open" conditions so that the crystals 35 may be considered to be utilized as light switches.

It will be appreciated that instead of dividing the respective secondary beams 40 from a main laser beam, as illustrated in FIG. 1, each individual beam 40 could be derived from an individual laser beam generator, but it will be appreciated that the duplication involved would entail a prohibitive cost and thus would be commercially impractical.

The recordation drum 4 rotates in a direction indicated by arrow 44 and the respective light paths which are projected onto the recordation medium or film 6 at the area 43 by the fixedly positioned beams 40 will during the bright scanning, record adjacent lines. As a result of the bright/dark scanning, utilizing the crystals 35, raster spots are recorded therefrom which appear in the example as squares standing on one corner i.e., diagonally extending and presenting a diamond appearance. It will be appreciated that to enable a better understanding, the size thereof has been exaggerated. In reality they will be so small that they cannot be recognized by the human eye with dimensions in practice being about 0.25 mm for the raster field and with a number, for example, of 10 individual beams, 0.025 mm for the diameter for the respective light dots.

Figures 2, 2A, 2B, 2C, 2D, 4:
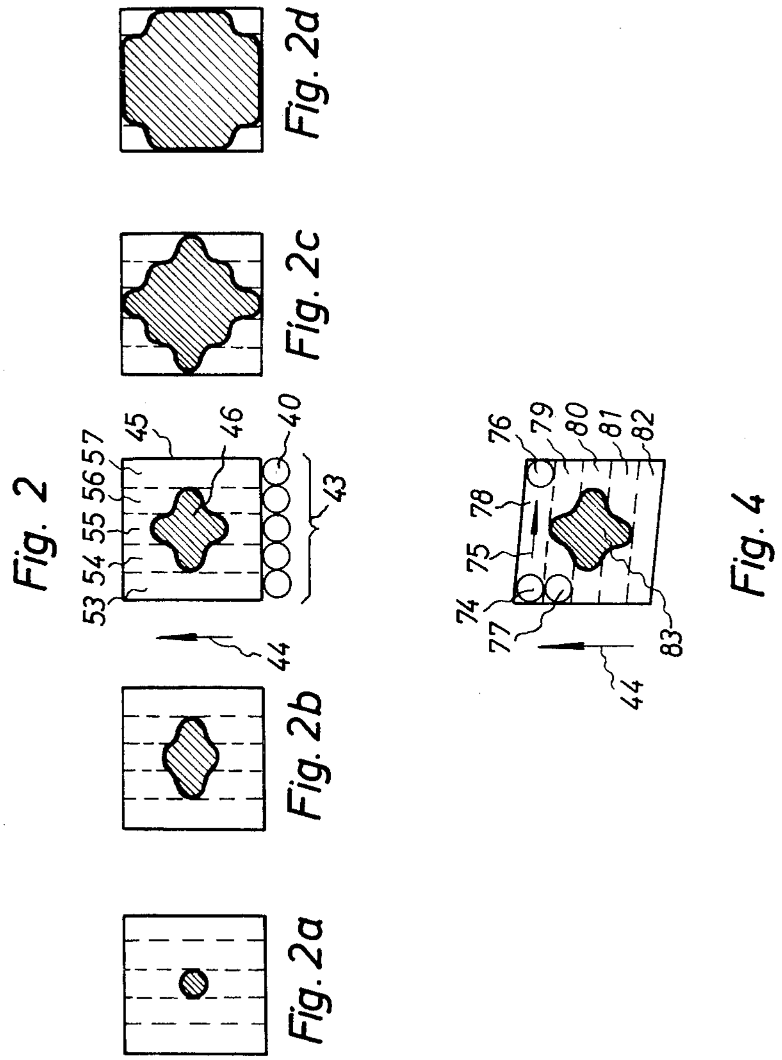

FIG. 2 and FIGS. 2*a* through 2*d* illustrate how differently shaped and varying size covering spots may be produced. FIG. 2 illustrates a covering spot 46 disposed in a square raster field 45, produced in a manner heretofore described by means of the control of the "on" or "off" condition of the beams 40 which, in effect, move over the paths 53 through 57 and assuming the recordation medium 6 moves in the direction indicated by the arrow 44, each beam will move in the apparent direction of from top to bottom as viewed in FIG. 2. Thus, by controlling the respective beams according to this applicable gray values, a plurality of cover spots can be produced, as illustrated in the examples of 2*a* and 2*b*, illustrating small spots and FIGS. 2*c* and 2*d* illustrating larger spots.

Figure 3:
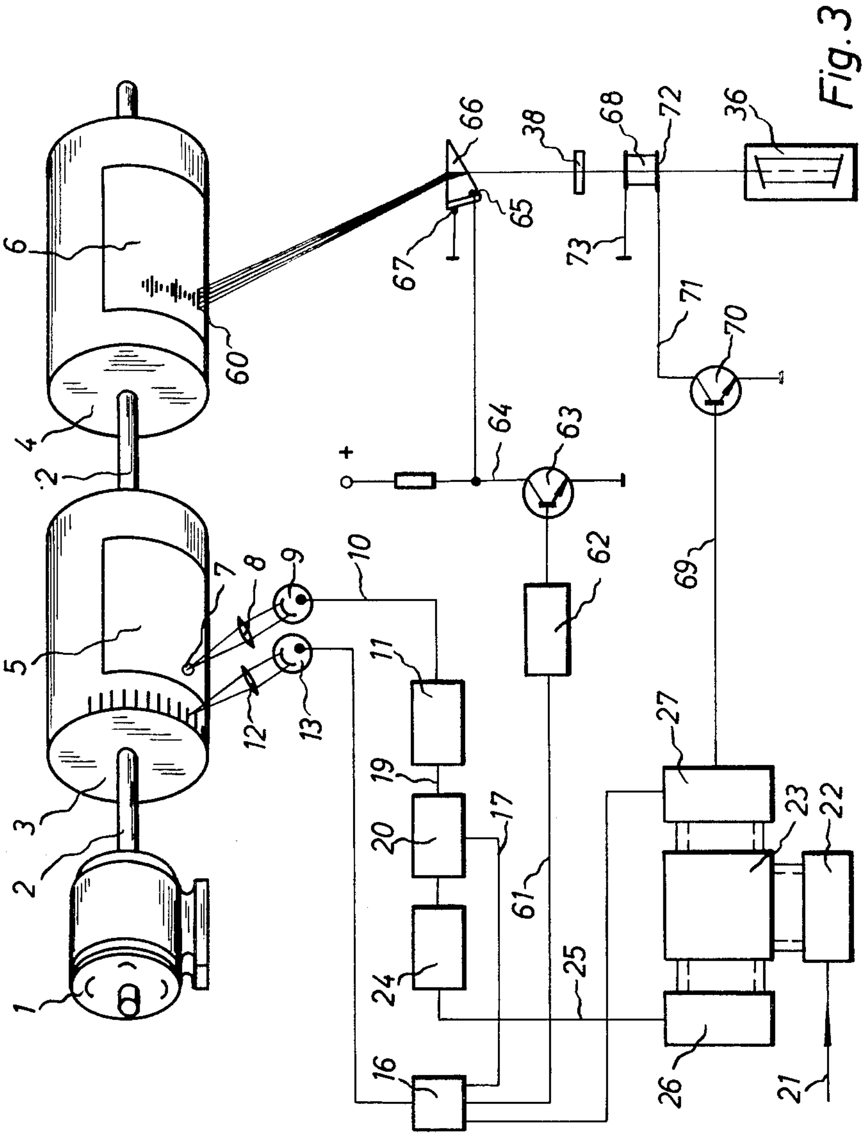
FIG. 3 is a semi-diagrammatic figure, similar to FIG. 1 illustrating a preferred embodiment of the invention utilizing only a single laser beam.

FIG. 3 illustrates a second embodiment of a device for practicing the present invention, the general construction of which is substantially the same as that found in FIG. 1. and corresponding parts are thus provided with corresponding reference numerals. The principal difference in the construction of FIG. 3 is that only a single laser beam is employed which is suitably deflected to project light spots in rapid succession on an area 60. Thus, while the recording medium a film moves upwardly due to rotation of the drum 4, the light beam is moved laterally back and forth so that almost horizontal lines are recorded, one following the other, at the recording location 60. For example, the number of lines employed may be comparable to the number of vertical lines arranged adjacent one another in FIG. 1, namely five, and as in the previous instance, a larger number such as up to 10 may be advantageous.

A saw-tooth generator 62 with a frequency of 5 to 10 times the frequency of the timing pulses at the conductor 17 is triggered by the timing pulse generator 16 over the line 61. This saw-tooth voltage, which has a slowly increasing flank and steeply decreasing flank may be amplified by a transistor amplifier 63 and conducted over line 64 to a control electrode 65 of a deflection crystal 66 whose refractory index changes under the influence of an electric field. The crystal, as illustrated, is in the form of a prism with the light beam intersecting the two inclined or converging lateral surfaces of the prism whereby the angle of incidence is inclined towards the base side. The beam is refracted at both inclined surfaces so that it emerges with a predetermined deflection to the exposure location 60 on the photo-medium 6.

The respective upper and lower parallel surfaces of the deflection crystal 66 are provided with electrically conductive coatings which form the electrodes, electrode 67 being grounded. The voltage between the coatings produces an electric field in the crystal which is permeated by the light beam in transverse direction whereby the field changes the refraction index of the crystal. With some crystals, for example, potassium-dihydrogen phosphate (KDP), this effect sufficiently large to permit its advantageous utilization for the deflection control of light beams, such as in the present case. Deflection angles of up to approximately 2° can be obtained which is more than sufficient to produce the desired deflections of the light beam at the recording location 60 i.e., of up to about 0.25 mm as required. It will be appreciated that such deflection angle can be readily increased, if necessary, by utilizing two or more deflection crystals disposed optically in series and controlled in corresponding relation.

The control of the intensity or brightness of the laser light beam in this embodiment of the invention is effected in the same manner as that described with respect to FIG. 1, i.e., by effecting rotation of the polarization plane of a rotary crystal 68 by means of an electric field which is produced by the application of a voltage between electrode 72 and an opposite grounded electrode 73, with such voltage being supplied by an amplifier transistor 70 over a conductor 71, which transistor in turn is controlled over conductor 69 by the output signals of the read register 27. Theoretically, the brightness control of the light beam might also be effected by means of controlling the laser but this type of control is not achievable, as a practical matter, with currently available lasers as adequate control speeds cannot be obtained.

FIG. 4 illustrates an example of a raster field having a raster spot produced with the apparatus of FIG. 3, which generally corresponds to FIG. 2 as to shape but produced by different means. In this figure, the direction of movement of the recording material is indicated by the arrow 44 and it will be appreciated that as the recording material moves in such direction, simultaneously therewith the light dot 74 moves in direction 75 under control of the slowly rising sawtooth voltage. After the end position 76 is reached, representing the end of the raster field, the beam is quickly returned, as a result of the steep rear flank of the sawtooth voltage, into the initial position 77 representing the starting position for the recordation of the next picture line. While the light dot successively passes through the picture lines 78 through 82 the light beam is controlled in accordance with the data stored in the memory 23 and it thus records the raster dot 83. As a result of the superimposition of the concurrent othogingally-directed movements of the recording medium and the light dot, the lines 78 through 82 will appear slightly inclined, but this is of no importance as to the end result. Furthermore, such inclination can readily be compensated rotating the recording direction around the laser beam axis in the opposite sense.

As rotary crystals such as the type used herein for deflection control are very temperature dependent, in order to insure operational accuracy, suitable measures for maintaining suitable control of the temperature will normally be required. Such means may consist in the application of generally known and commonly employed control devices whereby the crystals are inserted into housings whose temperature is maintained constant by means of suitable control of the heat, employing, for example, switch thermostats and the like. A particularly advantageous solution to the problem here involved comprises in utilizing the cooling agent associated with the laser (which must in any event be cooled) for maintaining a constant operational temperature of the crystals.

Figure 5:
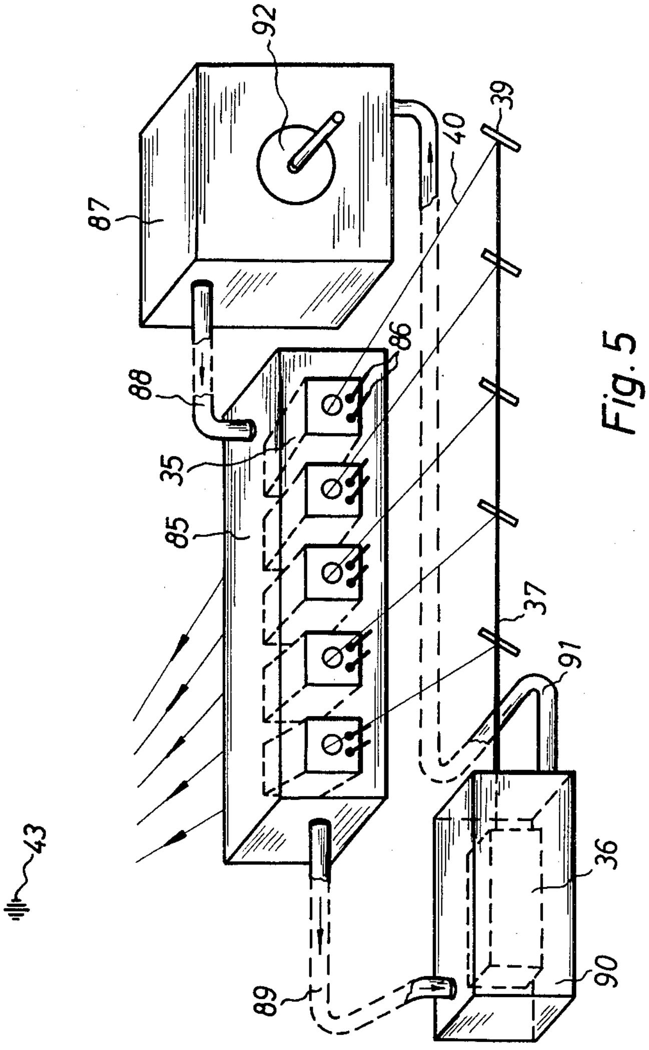
FIG. 5 illustrates a cooling arrangement for the structure illustrated in FIG. 1.

FIG. 5 illustrates an advantageous construction of means for maintaining temperature control of the laser and crystals as applied to the structure illustrated in FIG. 1. The light beam 37 of the laser 36, as previously described, is intersected by a plurality of mirrors 39 which divide the same into respective partial beams 40 and which travel to the recording location 43 on the recording material 6 by passage through the crystals 35. The latter may be inserted in a cooling chamber 85 which is supplied with a gas or liquid cooling agent which flows around the crystals. For example, water may be advantageously utilized. The crystals are suitably inserted in the chamber with suitable protection from the liquid or air but by means which provides as good as possible a heat exchange therebetween. Electrical connection to the crystals may be provided by suitable connecting lugs 86. The cooling water may be conducted from a supply container 87 by means of piping 88 into the cooling chamber 85, in which it flows around the respective crystals and is discharged from the cooling chamber, over piping 89, to the laser 36 which is likewise inserted in a cooling chamber 90. The cooling liquid is then returned over piping 91 to the container 87.

As energy conversion at the crystals is relatively low, the cooling liquid absorbs relatively only a small amount of heat as it flows through the cooling chamber 85. However, a large amount of cooling is required at the laser since the greatest portion of the supplied energy must be absorbed due to the small efficiency of the laser. The cool water thus first flows through the cooling chamber 85 containing the control crystals and subsequently through the cooling chamber 90 of the laser. Obviously, the supply container 87 should be suitably designed to supply adequate cooling to the returned liquid in order to maintain the circulating liquid at a substantially constant temperature. The transport of the cooling liquid may be effected by a pump 92.

It will be appreciated that the guidance of the respective beams 40 by means of the mirrors 39 through the control crystals 35 the polarization filters 38 and the lenses 41 to the exact position 43 desired on the recording film 6 presents a somewhat difficult problem as the light dots which effect the recording of the individual lightbeams on the film, as previously mentioned, have only a 0.025 mm diameter and the entire dot group at the recordation location is only about 0.25 mm in width. The exact positioning of the light beams within the group thus is possible only by means of fine adjusting devices, for example, employing micrometer screw drives, which would have to be provided for each individual mirror 39.

Figure 6:
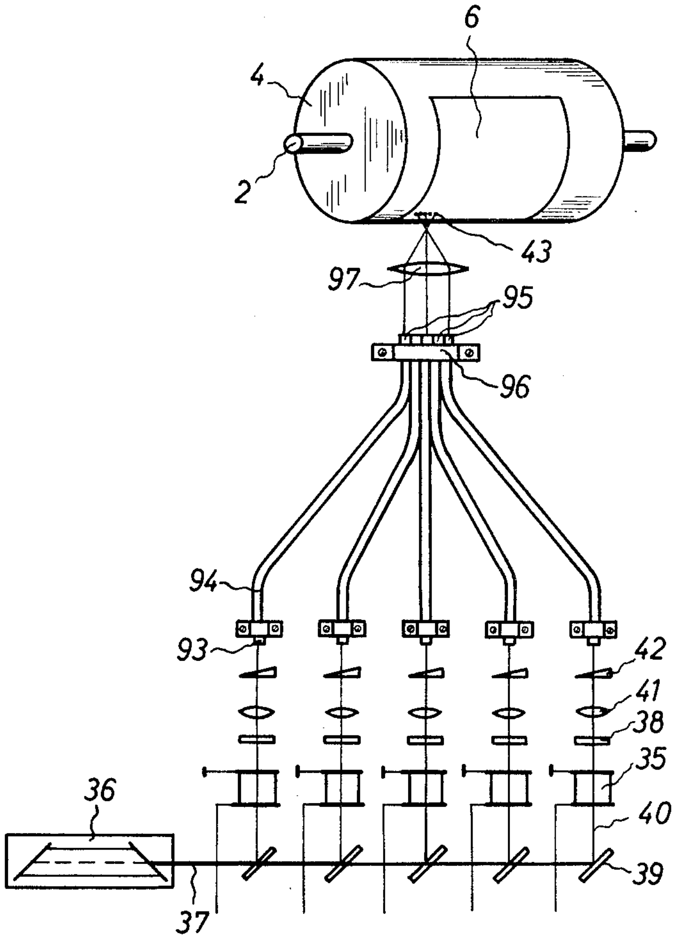
FIG. 6 illustrates a modification of the structure illustrated in FIG. 1.

The construction illustrated in FIG. 6 eliminates this problem. Here, the division of the laser beam 37 is effected in the same manner as in FIG. 1 with the use of partially reflecting mirrors 39, which, however, may now be deflected at substantially the same angle, or at an angle which is particularly favorable for deriving the individual secondary beams. Each secondary beam 40 thus is projected onto the light-receiving end or face 93 of a respective light-fiber conductor 94 after the beam has passed through the associated rotary crystal 35, polarization filter 38, lens 41 and gray wedge 42. Each light conductor has an effective diameter on the order of about 0.1 mm.

The light emitting ends or faces of the respective light fiber conductors of all the respective beams are disposed in adjacent relation with such faces lying in a common plane 95 and the adjacent ends of the conductors fixed in a suitable mounting structure 96. When all the beams are in operation, a line of illuminating dots will appear at such frontal discharge surfaces which are all of equal size, exactly directioned and disposed at equal distances. Such dots are suitably decreased in size by means of an optical objective 97 and projected on the recording area 43. The amount of decrease thus determines the width of the dot line 43 and thus the width of the raster fields and the so-called raster width respectively. By a suitable interchange or adjustment of the objective 97 the amount of decrease can be varied and thus rasters of different fineness or coarseness can be recorded.

Having thus described my invention it will be apparent that various immaterial modifications may be made in the same without departing from the spirit of my invention.

I claim as my invention:

1. A method of recording rastered continuous tone pictures in printed graphics in which respective covering spots create the recorded picture, with the size of the spots corresponding to the tone value to be depicted thereby, comprising the steps of effecting recordation on a light sensitive medium by directing thereon polarized light to produce covering spots thereon, recording each spot in a respective individual raster field, and varying the polarization characteristics of the path of such light between the source thereof and the recording medium to vary the light intensity at the medium, and so varying such polarization characteristics, to control the intensity of the light directed on said medium at different portions of the raster field, in dependence upon the size of the spot to be produced for creating the desired tone effect thereat.

2. A method according to claim 1, wherein said path polarization characteristics are varied by filtering out light of predetermined polarization, and selectively varying the polarization of light to be subjected to the filtering action, whereby the intensity of light at the medium is dependent upon the polarization variation between said predetermined filtering polarization and that of the light subjected to the filtering action.

3. A method according to claim 2, wherein the light directed to a raster of said medium is derived from a plurality of light beams obtained by division of a single light beam, and controlling each beam independently as to intensity thereof in dependence upon the size of the covering spot to be produced in such raster area.

4. A method according to claim 3, wherein the respective light beams, following division, extend in substantially parallel paths, effecting polarization variations in the respective beams independently of one another while in said parallel paths, and subsequently directing the respective beams, by light conduction through respective formed light transmitting paths to adjacent the recording medium, each beam being operative to cover a scanning line of a respective raster area.

5. A method according to claim 4, comprising effecting said polarization filtering of the respective beams while in said parallel paths.

6. A method according to claim 5, wherein the respective light beams, following division, extend in converging paths to adjacent a respective raster area, comprising effecting said polarization variations and polarization filtering in the respective beams independently of one another while in said converging paths.

7. A method according to claim 2, wherein the light directed to a raster field of said medium is in the form of a single beam, comprising in further combination, the step of deflecting said beam over such a raster area in a series of scanning lines.

8. A device for recording rastered continuous tone pictures in printed graphics, in which respective covering spots create the recorded picture, with the size of the spots corresponding to the tone value to be depicted thereby, comprising laser beam generator means, means for directing light from said generator means on a respective individual raster field of a light sensitive recording medium, for the production of covering spots thereon, means disposed in the light path between said generator and said medium means for imparting predetermined light polarization characteristics to such light path, adjustable means disposed between said last-mentioned means and said generator for varying the polarization characteristics of light traveling along said light path to said polarization imparting means, and means for effecting adjustment of said adjustable means in dependence upon the size of the cover spot to be formed in the particular raster field to respondingly vary the size of the area receiving light from said generator in such raster field whereby the covering spots produced will create the desired tone effect.

9. A device according to claim 8, wherein said means for imparting predetermined polarization characteristics comprises polarization filter means having predetermined directional polarization, said adjustable means comprising electrically controllable rotary crystal means, with the intensity of light at the recording medium being dependent upon the angular difference between the polarization directions of said rotary crystal means and said filter means.

10. A device according to claim 9, wherein relative orientation of said rotary crystal means and cooperable filter means is such that in the absence of an electric field at such crystal means the polarization directions of said crystal means and cooperable filter means extend at right angles to one another.

11. A device according to claim 9, wherein the light directed to a raster field of said medium comprises a plurality of respective light beams, each light beam having associated therewith a respective polarization filter and a respective rotary crystal.

12. A device according to claim 11, wherein a single main laser beam generator is provided, comprising in further combination means for dividing said main beam into said plurality of respective secondary beams.

13. A device according to claim 12, wherein said dividing means comprises a plurality of partially reflecting and partially light permeable mirrors arranged to successively intersect the main laser beam, said mirrors being constructed to provide respective reflected secondary beams of approximately uniform light intensity.

14. A device according to claim 13, comprising in further combination, adjustable means disposed in the path of each secondary beam for independently adjusting the light intensity thereof to provide respective beams of substantially uniform light intensity.

15. A device according to claim 13, wherein said mirrors are arranged to reflect light from said main beam in converging directions toward such a raster field of said medium.

16. A device according to claim 13, wherein said mirrors are arranged to reflect light in the same general direction relative to the direction of said main beam, said polarization filters and said rotary crystals being disposed in the respective paths of such beams, and elongated light conducting fiber means disposed between respective filters and said recording medium for conducting each beam to adjacent such a raster field with the light emitting ends of such fiber means being disposed in laterally aligned relation with respect to the axis of the associated drum.

17. A device according to claim 13, wherein a single laser generator is employed, which single beam is directed to a raster field of the medium, with a polarization filter and a rotary crystal being disposed in the path of said single beam, and means interposed in the path of said beam between the medium and said filter for laterally deflecting said beam over such a raster field in a series of scanning lines extending parallel to the axis of the associated drum.

18. A device according to claim 17, wherein said deflecting means comprises a deflection crystal having a refraction index which varies under the action of an electric field, said deflection crystal having a prismatic shape with converging faces forming the light entry and exit faces whereby deflection of the beam may be achieved by production of an electric field effective on said deflection crystal.

19. A device according to claim 9 comprising in further combination means associated with said laser generator means, and means associated with said crystal means for cooling said means.

20. A device according to claim 19, wherein said cooling means comprises respective cooling means chambers in which said laser means and said crystal means are respectively disposed, a supply of a cooling fluid, conduit means for conducting the cooling fluid to said chamber in series with such fluid initially passing through the chamber in which the crystal means is disposed, and pump means for effecting a circulation of such fluid through said chamber.

* * * * *